(12) United States Patent
Martin

(10) Patent No.: US 12,037,263 B2
(45) Date of Patent: Jul. 16, 2024

(54) METHOD AND SYSTEM FOR THE REMEDIATION OF AQUATIC FACILITIES

(71) Applicant: Roy W. Martin, Downers Grove, IL (US)

(72) Inventor: Roy W. Martin, Downers Grove, IL (US)

(73) Assignee: TRUOX, INC., Naples, FL (US)

( * ) Notice: Subject to any disclaimer, the term of this patent is extended or adjusted under 35 U.S.C. 154(b) by 76 days.

(21) Appl. No.: 17/205,316

(22) Filed: Mar. 18, 2021

(65) Prior Publication Data

US 2021/0323838 A1 Oct. 21, 2021

Related U.S. Application Data

(60) Provisional application No. 63/013,007, filed on Apr. 21, 2020.

(51) Int. Cl.
*C02F 1/00* (2023.01)
*C02F 1/68* (2023.01)
(Continued)

(52) U.S. Cl.
CPC .............. *C02F 1/008* (2013.01); *C02F 1/685* (2013.01); *C02F 1/76* (2013.01); *C02F 2103/42* (2013.01);
(Continued)

(58) Field of Classification Search
CPC .. C02F 1/008; C02F 1/00; C02F 1/685; C02F 1/686; C02F 1/687; C02F 1/688; C02F 1/72; C02F 1/722; C02F 1/725; C02F 1/766; C02F 1/76; C02F 2303/02; C02F 2303/04; C02F 2103/42; C02F 2209/003; C02F 2209/001; C02F 2209/005;
(Continued)

(56) References Cited

U.S. PATENT DOCUMENTS

| 4,044,103 | A |   | 8/1977 | Mollard |           |
|-----------|---|---|--------|---------|-----------|
| 4,224,154 | A | * | 9/1980 | Steininger | C02F 1/008 |
|           |   |   |        |         | 210/85    |

(Continued)

FOREIGN PATENT DOCUMENTS

| BR | 9605603 A  | * | 8/1998 |          |
|----|------------|---|--------|----------|
| CA | 2765637 A1 | * | 7/2013 | C02F 1/54 |

(Continued)

OTHER PUBLICATIONS

Chlorine Contact Time for Small Water Systems, Washington State Department of Health, 2 pages (Year: 2016).*

(Continued)

*Primary Examiner* — Akash K Varma
(74) *Attorney, Agent, or Firm* — Jeffrey S. Melcher; Melcher Patent Law PLLC

(57) ABSTRACT

A system and method for controlling the remediation of aquatic facilities using at least one sanitizer sensor, a pH sensor, a temperature sensor and a chlorine dioxide sensor all interfaced with a programmable controller that is programmed to implement a remediation cycle and configured to calculate a Ct value, the sensors being in fluid contact with water of the aquatic facility, and the programmable controller is interfaced with a chemical feed system for supplying chlorine dioxide to the water.

38 Claims, 10 Drawing Sheets

(51) Int. Cl.
*C02F 1/76* (2023.01)
*C02F 103/42* (2006.01)
(52) U.S. Cl.
CPC .. *C02F 2209/003* (2013.01); *C02F 2209/006* (2013.01); *C02F 2209/02* (2013.01); *C02F 2209/06* (2013.01); *C02F 2209/29* (2013.01)
(58) Field of Classification Search
CPC .......... C02F 2209/006; C02F 2209/245; C02F 2209/04; C02F 2209/05; C02F 2209/055; C02F 2209/08; C02F 2209/20; C02F 2209/36; C02F 2209/24; C02F 2209/02; C02F 2209/06; C02F 2209/01; C02F 2209/10; C02F 2209/21; C02F 2209/44; C02F 2209/29
USPC ........................................................ 210/742
See application file for complete search history.

(56) References Cited

U.S. PATENT DOCUMENTS

| | | | |
|---|---|---|---|
| 4,414,180 A * | 11/1983 | Fisher | C01B 11/024 422/186 |
| 4,456,511 A * | 6/1984 | Fisher | B01J 19/122 204/157.48 |
| 6,824,756 B2 | 11/2004 | Rosenblatt | |
| 6,855,294 B2 | 2/2005 | Taylor | |
| 7,261,821 B2 | 8/2007 | Beardwood | |
| 7,311,884 B2 | 12/2007 | Brownfield | |
| 7,407,641 B2 | 8/2008 | Cowley | |
| 7,465,412 B2 | 12/2008 | Pickens | |
| 7,504,074 B2 | 3/2009 | Martens | |
| 7,754,057 B2 | 7/2010 | O-Leary | |
| 7,833,392 B2 | 11/2010 | Nanjundiah | |
| 7,922,933 B2 | 4/2011 | Martin | |
| 7,927,509 B2 | 4/2011 | Martin | |
| 7,964,138 B2 | 7/2011 | Richrdson | |
| 7,976,725 B2 | 7/2011 | Martin | |
| 8,088,300 B2 | 1/2012 | Byrne | |
| 8,211,296 B2 | 7/2012 | Angelilli | |
| 9,175,208 B2 | 11/2015 | Thompson | |
| 9,521,841 B2 | 12/2016 | Goda | |
| 9,656,891 B2 | 5/2017 | Martin | |
| 9,675,065 B2 | 6/2017 | Martin | |
| 10,427,959 B2 | 10/2019 | Martin | |
| 10,669,173 B2 | 2/2020 | Fujiwara et al. | |
| 10,807,882 B2 | 10/2020 | Lawryshyn et al. | |
| 11,535,541 B2 | 12/2022 | Gupta | |
| 2002/0014463 A1 * | 2/2002 | Iverson | C02F 5/083 210/749 |
| 2006/0088498 A1 | 4/2006 | Martin | |
| 2006/0131245 A1 * | 6/2006 | Dennis, II | C02F 1/008 210/746 |
| 2007/0193958 A1 | 8/2007 | Martin | |
| 2010/0189630 A1 * | 7/2010 | Martin | C01B 11/024 423/477 |
| 2011/0000860 A1 * | 1/2011 | Bland | C02F 1/32 204/157.48 |
| 2011/0288049 A1 * | 11/2011 | Blandford | C08B 37/0012 252/175 |
| 2012/0207858 A1 | 8/2012 | Martin | |
| 2013/0126403 A1 | 5/2013 | Kilawee | |
| 2013/0334113 A1 * | 12/2013 | Erlich | E04H 4/1263 210/167.1 |
| 2014/0322349 A1 | 10/2014 | Martin | |
| 2015/0041136 A1 | 2/2015 | Martin | |
| 2015/0060370 A1 | 3/2015 | Martin | |
| 2015/0065403 A1 | 3/2015 | Martin | |
| 2015/0196027 A1 | 7/2015 | Martin | |
| 2015/0216874 A1 | 8/2015 | Martin | |
| 2016/0032173 A1 | 2/2016 | Martin | |
| 2017/0105412 A9 | 4/2017 | Martin | |
| 2018/0099882 A1 | 4/2018 | Martin | |
| 2019/0055146 A1 | 2/2019 | Xiong et al. | |
| 2019/0187089 A1 | 6/2019 | Endress | |
| 2019/0194047 A1 | 6/2019 | Martin | |
| 2019/0300398 A1 | 10/2019 | Martin | |
| 2020/0123033 A1 | 4/2020 | Martin | |
| 2020/0189944 A1 | 6/2020 | Martin | |
| 2020/0239340 A1 | 7/2020 | Martin | |
| 2020/0319621 A1 * | 10/2020 | Roy | G01L 19/086 |
| 2020/0346948 A1 | 11/2020 | Martin | |
| 2020/0354218 A1 | 11/2020 | Martin | |
| 2022/0127164 A1 | 4/2022 | Martin | |
| 2023/0144546 A1 * | 5/2023 | Potucek | G01L 19/086 700/282 |

FOREIGN PATENT DOCUMENTS

| | | |
|---|---|---|
| CN | 202758205 | 2/2013 |
| WO | 2021/216347 | 10/2021 |

OTHER PUBLICATIONS

English Machine Translation of BR-9605603-A (Sperb et al.) (3 pages) (Year: 1998).*
Written Opinion and search report issued in corresponding PCT/US2021/027441, Jul. 9, 2021, pp. 1-25.
Written Opinion and search report issued in PCT/US2022/011892, Mar. 22, 2022, pp. 1-13.
Written Opinion and search report issued in PCT/US2023/27862, Nov. 15, 2023, pp. 1-16.
European Search Report issued in European Patent Application No. 21793364.7, Jan. 31, 2024, pp. 1-9.
EPA Technical Guidance Manual, Disinfection Profiling and Benchmarking, Office of Water, EPA 815-R-20-003, Jun. 2020, pp. 1-162.

* cited by examiner

US 12,037,263 B2

METHOD AND SYSTEM FOR THE REMEDIATION OF AQUATIC FACILITIES

FIELD OF INVENTION

The invention relates to a method and system for remediation of the water of an aquatic facility using a programmable controller programmed to implement a remediation cycle and configured to calculate a Ct value, track the Ct value in real-time and continue the remediation cycle until a target Ct value is achieved.

BACKGROUND

Free chlorine and free bromine are common sanitizers for the treatment of aquatic facilities. While effective at controlling bacteria counts in the water, they have limited efficacy against waterborne pathogens that are resistant to the sanitizers such as *Cryptosporidium*.

The Centers for Disease Control and Prevention has reported waterborne pathogens such as *Cryptosporidium* are accountable for nearly 80% of all Recreational Water Illness (RWI) in the United States. To a lesser degree but still significant are other waterborne pathogens such as *Legionella* that are resistant to chlorine due to the formation of biofilm that protect the bacteria from the chlorine.

Chlorine dioxide is favored over many oxidizing biocides due to its biocide efficacy over a broad pH range, low use rate, biofilm penetration and high selectivity in contaminated water.

In order to ensure aquatic facilities are properly protected from waterborne pathogens, there is a need for controlling two types of applications used for remediating. The first is a daily remediation and the second is a rapid recovery shock.

Daily remediation is necessary due to the fact that aquatic facilities that have been compromised by a waterborne pathogen such as *Cryptosporidium* will not know they have been compromised until symptoms are identified and confirmed often many days or even weeks later. By the time confirmation is made, the pathogen can spread to hundreds or even thousands of people who used the aquatic facility and/or have spread the pathogen to other aquatic facilities thereby propagating the spread of infection. Implementing an automated system that remediates the aquatic facility on a daily basis would dramatically reduce the potential for infection as well as virtually eliminate the spread to other aquatic facilities.

Rapid recovery shock is applied when a known event such as a fecal release is identified. The control system can be manually activated to implement a remediation cycle, track the Ct value in near real-time, and terminate the remediation cycle when the targeted Ct value has been achieved. Furthermore, the control system can then be programmed to neutralize excess treatment (e.g. chlorine dioxide and/or excess sanitizer) after achieving the target Ct value to prepare the aquatic facility for opening to the public.

U.S. Pat. Nos. 7,922,933, 7,927,509, and 7,976,725 which are herein incorporated by reference in their entirety, disclose a cyclic process for the in-situ generation of chlorine dioxide. The cyclic process utilizes bromide ions that are activated by an oxidant to produce free bromine. The free bromine oxidizes chlorite ions producing chlorine dioxide. Chlorine dioxide inactivates microbiological organisms (i.e. *Cryptosporidium*). During this process the free bromine and at least some portion of the chlorine dioxide are reduced back to bromide ions and chlorite ions respectively which are recycled back to free bromine and chlorine dioxide utilizing the cyclic process.

U.S. application Ser. Nos. 16/501,355 and 16/501,567 which are herein incorporated by reference in its entirety, discloses methods for in-situ generation and stabilization of chlorine dioxide in the water of an aquatic facility using UV activation of chlorite ions.

SUMMARY OF THE INVENTION

Objectives of the invention include mitigating over 80% of all Recreational Water Illness (RWI) as described by the Centers for Disease Control and Prevention.

The objectives of the invention and other objectives can be obtained by a method for controlling the remediation of water of an aquatic facility, the method comprising:

providing a system comprising at least one sanitizer sensor for measuring a concentration of sanitizer in the water, a pH sensor for measuring a pH of the water, a temperature sensor for measuring a temperature of the water, and a chlorine dioxide sensor for measuring a concentration of chlorine dioxide in the water, the at least one sanitizer sensor, pH sensor, temperature sensor and chlorine dioxide sensor being interfaced with a programmable controller that is programmed to implement a remediation cycle and configured to calculate a Ct value of the water, and the programmable controller is interfaced with a chemical feed system that is in fluid contact with the water;

measuring a temperature of the water by the water temperature sensor;

implementing a remediation cycle by the programmable controller;

introducing chlorine dioxide into the water by the chemical feed system;

measuring a chlorine dioxide concentration by the chlorine dioxide sensor;

recording the chlorine dioxide concentration and calculating a Ct value by the programmable controller;

sustaining the chlorine dioxide concentration until a targeted Ct value is reached to achieve remediation;

measuring a pH of the water by the pH sensor;

adding a pH adjusting chemical to the water by the chemical feed system;

measuring a concentration of sanitizer by the at least one sanitizer sensor; and adding sanitizer to the water by the chemical feed system.

The objectives can also be obtained by a system for controlling the remediation of water in an aquatic facility, the system comprising:

a programmable controller;

at least one sanitizer sensor in fluid communication with the water and connected to the programmable controller;

a pH sensor in fluid communication with the water and connected to the programmable controller;

a temperature sensor in fluid communication with the water and connected to the programmable controller;

a chlorine dioxide sensor in fluid communication with the water and connected to the programmable controller;

a chemical feed system in fluid contact with the water and connected to the programmable controller, the chemical feed system configured to supply chlorine dioxide, sanitizers, and pH adjusting chemicals to the water; and wherein the programmable controller is programmed to implement a remediation cycle and configured to calculate a Ct value, track the Ct value in real-time and continue the remediation cycle until the target Ct value is achieved, and a pH and sanitizer concentration is controlled by the programmable controller.

The programmable controller calculates, records, and stores the Ct value. The programmable controller can also display the Ct value. The programmable controller can be programmed to forecast the time to achieve the desired Ct value. The calculated Ct value can be based on the rolling average of the chlorine dioxide concentration. The Ct value is calculated at any desired interval, for example every 0.1 to 60 minutes. The Ct value can be calculated by:

$$Ct\ value = \Sigma[(X_n \div n) \times T]$$

Where:
"X" is the chlorine dioxide concentration in mg/l (or ppm).
"n" is the number of chlorine dioxide values recorded over the sampling period.
"T" is the period of time (minutes) that has lapsed over the sampling period.

Any suitable sanitizer sensor can be utilized, such as an ORP sensor or an amperometric sensor. The system preferably utilizes both ORP and amperometric sensors.

The implementation of the remediation cycle can be initiated automatically or manually, as desired. The programmable controller can be programmed to terminate the remediation cycle at a desired time.

Chlorine dioxide can be introduced to the water as desired from the remediation feed system and in any way. Preferably the chlorine dioxide introduction is a cyclic process. The remediation feed system can include, for example, a chlorine dioxide generator for generating chlorine dioxide, or by UV activation of chlorite ions. Preferably, chlorine dioxide is introduced to the water using a chlorine dioxide generator and/or cyclic process.

The system can further comprise neutralizing excess chlorine dioxide and/or neutralizing excess sanitizer by reducing agents fed to the water from a reducing agent feed system.

The programmable controller can be programmed to evaluate previous remediation cycles to determine the required application rate of chlorine dioxide to forecast future remediation cycles.

DETAILED DESCRIPTION OF THE INVENTION

Figure 10:
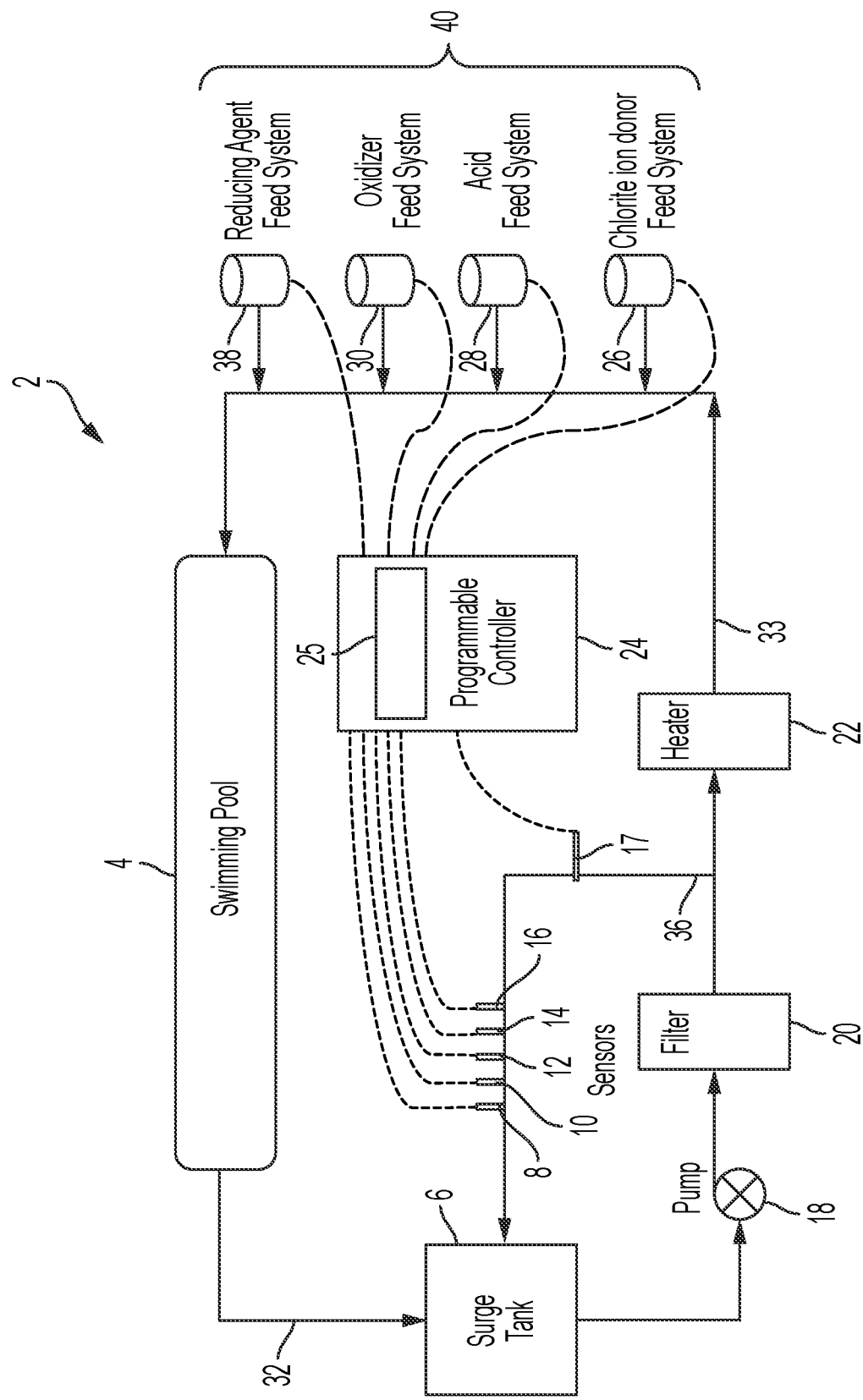
FIG. 10 illustrates a remediation system for remediating the water of an aquatic facility.

The invention will be explained with reference to attached non-limiting Figs. FIG. 10 illustrates an exemplary remediation system 2 for remediation of the water 4 in an aquatic facility. In an aquatic facility, the water 4, such as in a swimming pool, typically flows out of the pool through exit conduit 32 to a surge tank 6, water pump 18, filter 20, heater 22, and then back into the pool via return conduit 33. A chemical feed system 40 is connected to the water 2, such as through the conduit 32. Examples of chemical feed systems 40 include a sanitizer feed system 30 for supplying sanitizer to the water 4, a pH control feed system 27 for supplying chemicals to adjust or control the pH of the water 4, a remediation feed system 26 for supplying remediation chemicals to the water 4, and a reducing agent feed system 38 for supplying a reducing agent or other chemicals to the water 4.

A first sanitizer sensor 8 and a second sanitizer sensor 10 can be used measure the concentration of sanitizer in the water 4. For example, the first sanitizer sensor 8 can be an ORP senor and the second sanitizer sensor 10 can be amperometric type sensor. A pH sensor 12 can be used to measure the pH of the water 4. A chlorine dioxide sensor 14 can be used to measure the concentration of chlorine dioxide in the water 4. A temperature sensor 16 can be used to measure the temperature of the water 4. A flow sensor 17 can be used to measure the water flow through the conduit 36 from which the sensors 8, 10, 12, 14, 16 and 17 are connected to sample the water 4.

A programmable controller 24 is used to control the system 4. The remediation feed system 26, the pH control feed system 28 and the sanitizer feed system 30 can be connected to and controlled by the programmable controller 24. The sensors 8, 10, 12, 14, 16 and 17 can be connected to and controlled by the programmable controller 24.

The Florida Department of Health pH range for the water 4 of an aquatic facility is from 7.2 to 7.8 with the recommended range being 7.4 to 7.6. During a remediation cycle, the programmable controller 24 automatically monitors and controls the pH to operate within these ranges using the pH sensor 12 and pH feed system 28. Due to the significant lag time between the time of feeding pH related chemicals (i.e. acid) from the pH feed system 28 and the time to return a representative sample for the pH sensor 12 to measure, control logic is used to minimize the potential for overfeed of the chemical. One example of control logic is time-proportioned control.

The Florida Department of Health Sanitizer range for chlorine (reported as $Cl_2$) sanitizer is from 1-10 ppm in pools and 2-10 ppm in spas. For bromine (reported as $Br_2$) the ranges is 1.5-10 ppm in pools and 3-10 ppm in spas. During a daily remediation cycle the programmable controller will automatically control the feed of sanitizer within these ranges using the first and second sanitizer sensors 8 and 10 and sanitizer feed system 30. However, during a rapid recovery shock, the range of chlorine will be 1-50 ppm as $Cl_2$ in the case of chlorine and 2-100 ppm as $Br_2$.

During the remediation cycle the chlorine dioxide concentration, measured by the chlorine dioxide sensor 14, can vary based on the type of remediation. For a daily remediation cycle, the chlorine dioxide concentration can range from 0.0 to 2.0 ppm as $ClO_2$. When the remediation cycle begins, the chlorine dioxide concentration at Time=0 is 0.0 ppm. Over time the concentration of chlorine dioxide will increase. The desired maximum concentration is dependent on the time constraints to achieve the desired Ct value. When longer times are permitted such as in the case of an evening remediation when the aquatic facility is closed to the public, the maximum concentration of chlorine dioxide maybe as low as 0.1 ppm as $ClO_2$. In the event of a rapid recovery shock, it may be more desirable to increase to maximum concentration in the water as high as 20 ppm as $ClO_2$ to minimize the time the aquatic facility is closed to the public. Regardless of the range or maximum concentration of chlorine dioxide achieved, as long as the desired Ct value is achieved then remediation has been achieved.

Figure 7:
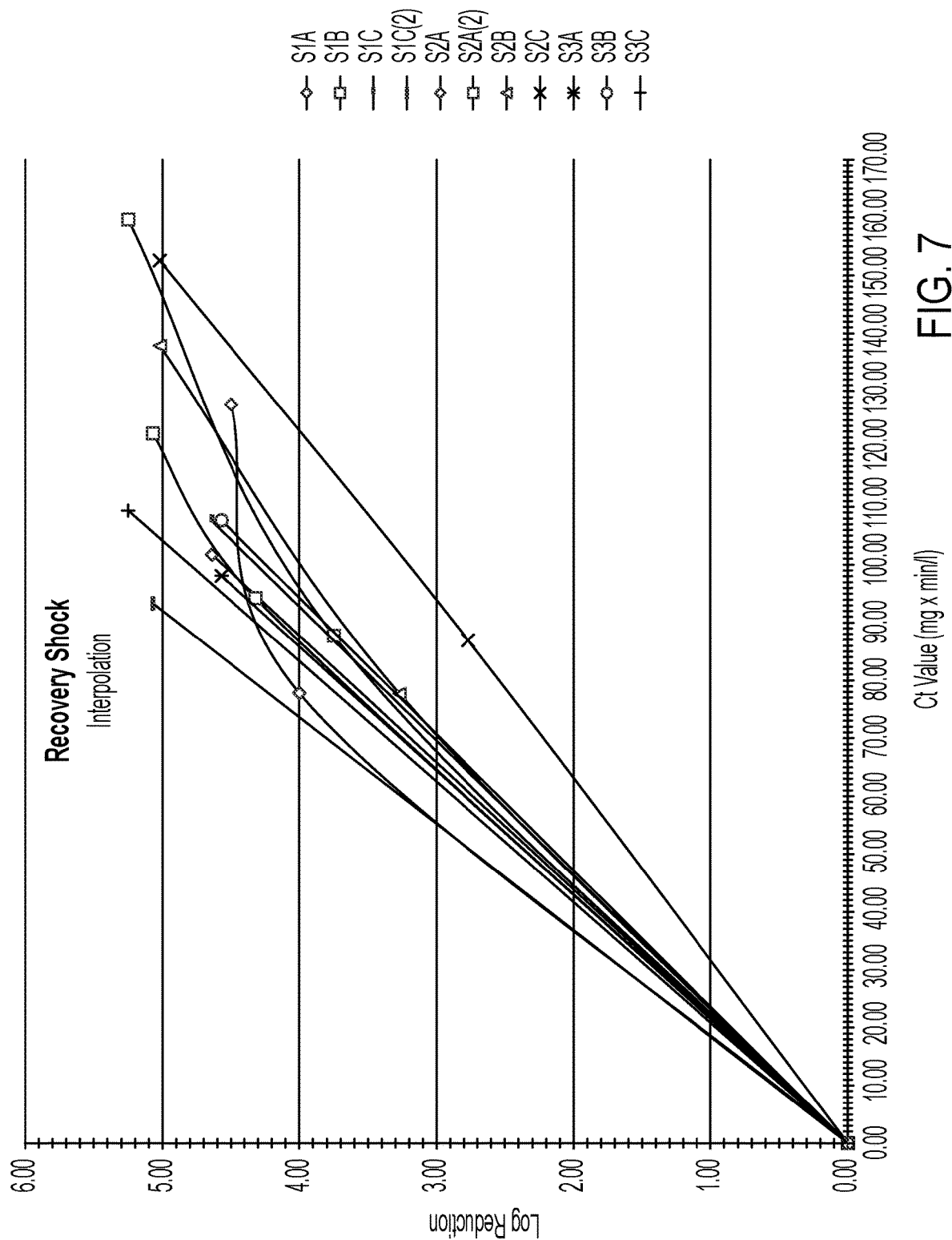
FIG. 7 illustrates the Ct values (min×mg/l) for achieving various log reductions in viable *Cryptosporidium* using the cyclic process. The method employed represents a Rapid Recovery Shock.
Figure 8:
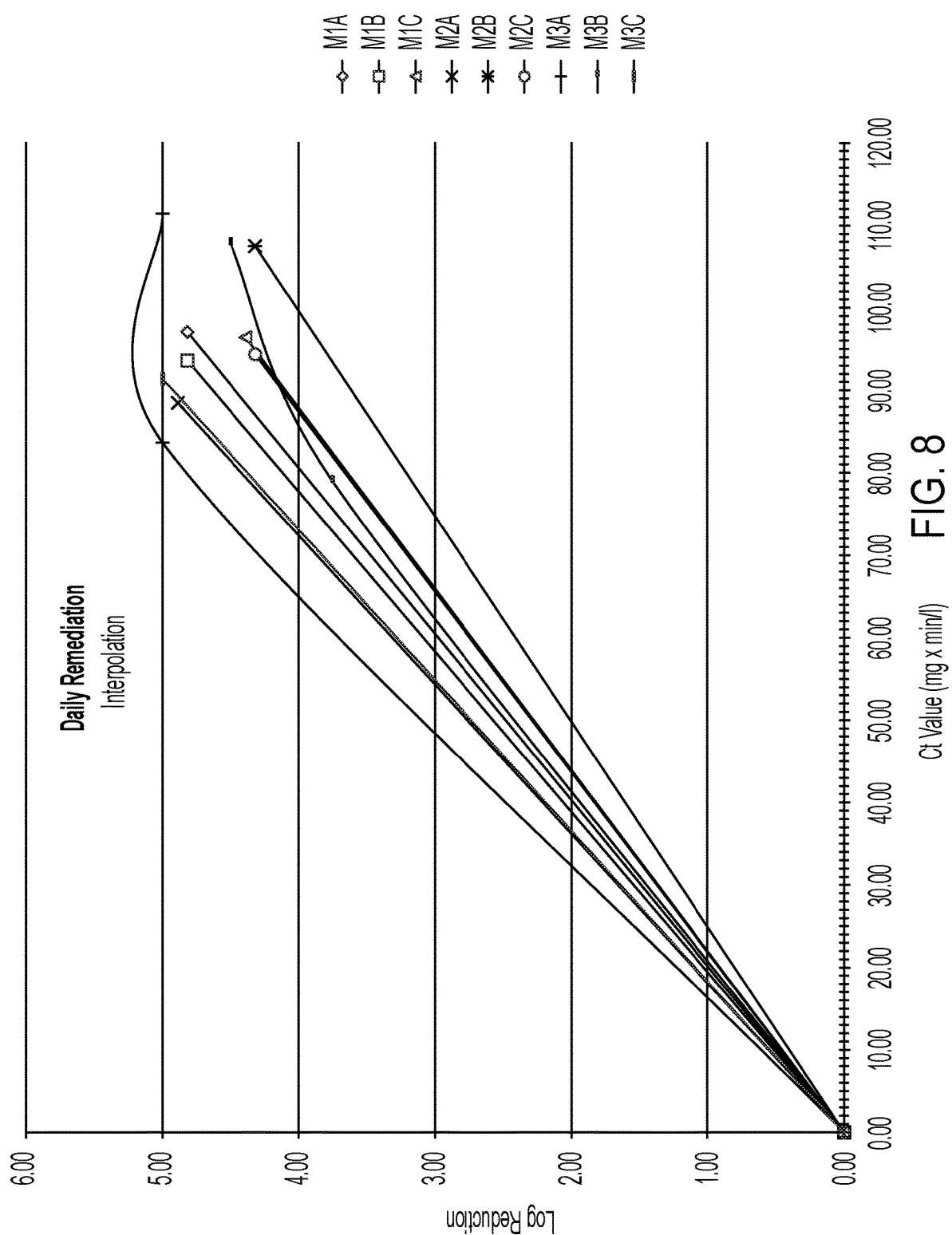
FIG. 8 illustrates the Ct values (min×mg/l) for achieving various log reductions in viable *Cryptosporidium* using the cyclic process. The method employed represents a Daily Remediation.

The Ct value (min×mg/l) can range from 1-200, more preferred 2-180, and most preferred 5-160. The optimum Ct value will depend on what is being remediated and the method of remediation being used. Referring to FIGS. 7 and 8, the charts illustrate the log reduction for *Cryptosporidium* for various Ct values using the cyclic process. Depending on the method used the Ct value required to remediate the *Cryptosporidium* (3-log reduction) varied. In the case of penetrating and removing biofilm in the piping of an aquatic facility the Ct value may be higher depending on the thickness and surface area covered by the biofilm.

The programmable controller 24 tracks the chlorine dioxide concentration measured by the chlorine dioxide sensor 14 during the remediation cycle and calculates the rolling average (also referred to as a "moving average"). The rolling average is multiplied by the time that has lapsed measured in minutes to update the Ct value in real-time. The rolling average can be updated over any desired period of lapsed time. One preferred period of lapsed time ranges from 0.1 to 60 minutes, more preferred 0.2 to 30 minutes, and most preferred 0.5 to 10 minutes. The ability to frequently update the real-time Ct value allows the programmable controller to forecast the trend and project when the targeted Ct value will be reached.

The ability to forecast when a remediation will be achieved, the programmable controller 24 can be programmed to learn from the previous remediation cycles and project and/or automatically adjust the concentration of chlorine dioxide and/or the application rate of chlorine dioxide in future remediation cycles to achieve a targeted Ct value within a desired time interval. For example, when using time-proportioned control logic, the controller 24 alters the feed duration of chlorine dioxide from the remediation feed system 26 based on how far the measured concentration of chlorine dioxide measured by the sensor 14 is from the set-point. If the sun's UV for example decomposes the chlorine dioxide at a high rate, the time required to achieve Ct value can be substantially increased. By evaluating the number of feed cycles, duration of the feed cycles, and the deviations from the set-point during and after said feed cycles, corrections can be made to compensate for the losses in chlorine dioxide concentration as well as the lag-times between applying chlorine dioxide and observing (measuring) the result.

Figure 1:
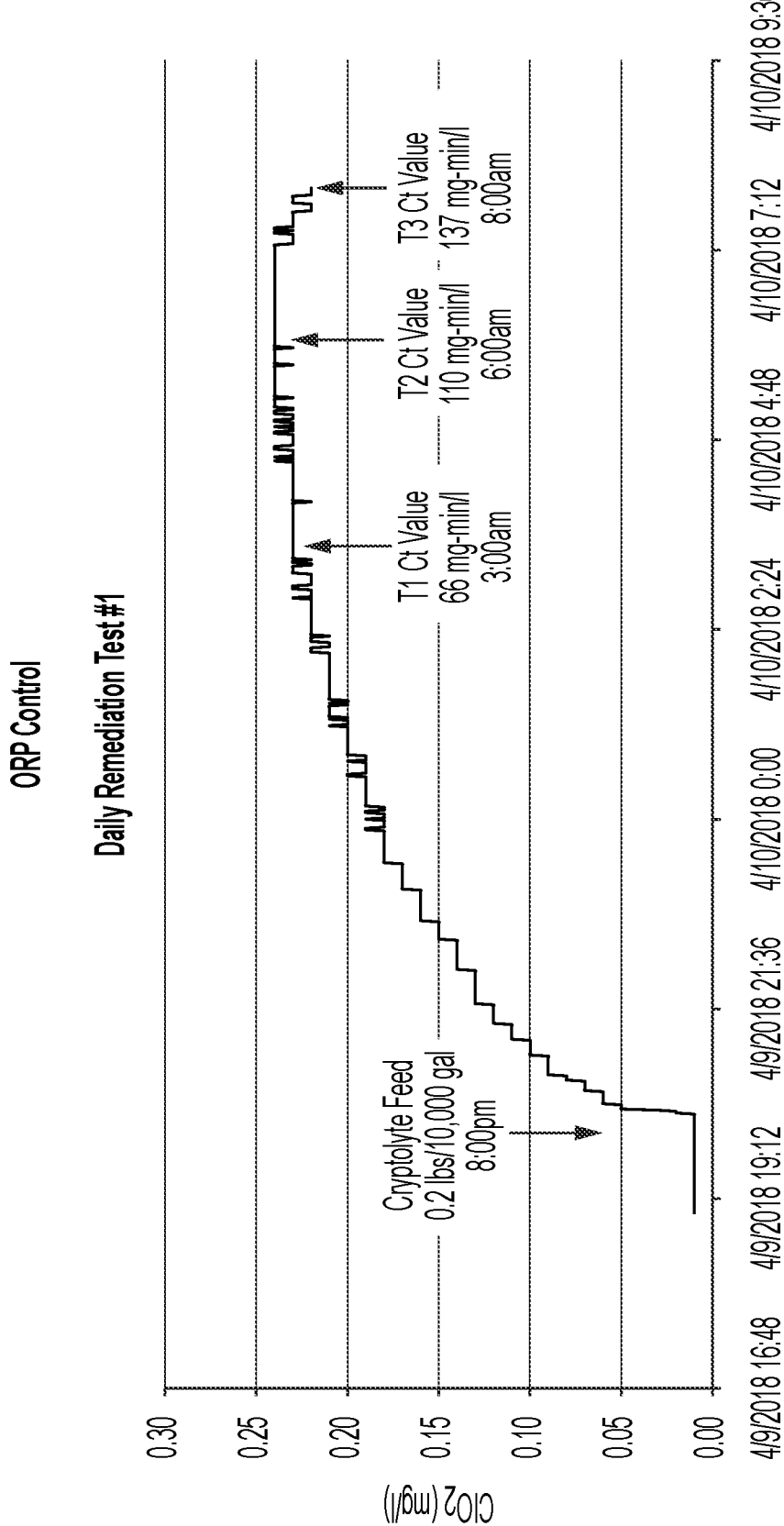
FIG. 1 illustrates the chlorine dioxide concentration and calculated Ct Value (min×mg/l) for a daily remediation (test #1) using the cyclic process for the in-situ generation of chlorine dioxide.
Figure 2:
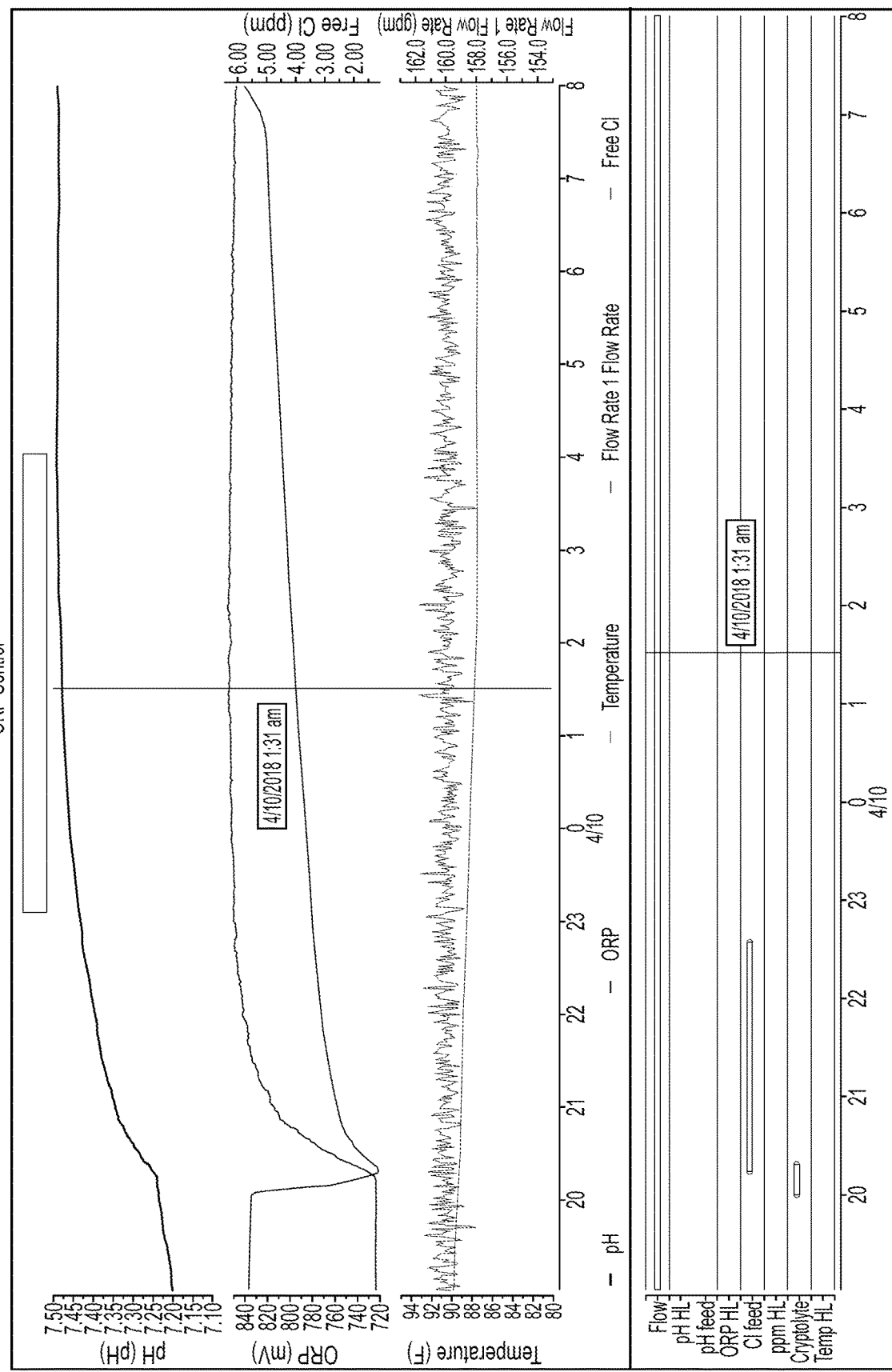
FIG. 2 illustrates the events log for test #1 using ORP as the means for controlling the feed of chlorine. Note with the addition of Cryptolyte® (sodium chlorite) caused the ORP to drop resulting in the feed of chlorine. The chlorine concentration elevated as a result. As the cyclic process depleted the chlorite, the ORP gradually increased.

The remediation cycle may comprise a single application of chlorine dioxide. For example, referring to FIGS. 1 and 2 illustrate that a single application of sodium chlorite under the brand name Cryptolyte® provided sufficient chlorine dioxide using the cyclic process to achieve a 3-log reduction in *Cryptosporidium* in only 7 hours. The remediation cycle began with the feed of Cryptolyte® at 8:00 pm and by 3:00 am the remediation cycle had achieved a Ct value of 66 (min×mg/l). Referring to FIG. 8, a Ct value of 66 (min× mg/l) is sufficient to remediate *Cryptosporidium*.

The remediation cycle may also apply multiple applications of chlorine dioxide. For example, when the remediation cycle uses ex-situ generation of chlorine dioxide such as in the case of using a chlorine dioxide generator as part of the remediation feed system 26, the programmable controller 24 can control the concentration of chlorine dioxide by applying multiple applications of chlorine dioxide to sustain a predetermined set-point of chlorine dioxide.

The remediation cycle can be automatically initiated by the programmable controller 24 such as in the case of planned evening remediation when the aquatic facility is closed to the public. However, in the case of a fecal release, the remediation cycles can be initiated manually, then carry out the functions automatically to perform the remediation.

The programmable controller 24 can be configured to calculate, record, and store the Ct value. Optionally the controller 24 can display the Ct value on the display 25 and callout to a technician in the event of a successful or failed remediation cycle. Once the Ct value has been achieved, the controller 24 terminates the remediation cycle.

When a targeted Ct value is achieved and the remediation cycle is terminated, adjustments to the water 4 chemistry may be required before opening the aquatic facility to patrons. In some cases such as a rapid recovery shock, excess sanitizer and chlorine dioxide can make the water unsuitable to swimmers. Neutralizing the excess sanitizer and chlorine dioxide can be automated by the system. The amperometric sensor 10 measures the excess chlorine as well as chlorine dioxide. The chlorine dioxide sensor 14 measures specifically chlorine dioxide. The difference between the two sensors 10 and 14 provides a relative concentration of sanitizer.

A reducing feed system 38 interfaced with the programmable controller 24 and in fluid contact with the water 4 of the aquatic facility provides the ability to feed a reducing agent exemplified by sodium thiosulfate in order to neutralize the excess oxidizers (sanitizer etc.), or any other desired chemicals. Furthermore, knowing the strength of the sodium thiosulfate solution, the feed rate of the chemical feed system 40, the volume of water to be treated etc., the programmable controller 24 can be programmed to calculate how much reducing agent to apply, then track the reductions in excess and adjust as needed until the water meets the water chemistry requirements to open.

The following terms used throughout the specification have the following meanings unless otherwise indicated.

"A" or "an" means "at least one" or "one or more" unless otherwise indicated.

"Comprise", "have", "include" and "contain" (and their variants) are open-ended linking verbs and allow the addition of other elements when used in a claim. "Consisting of" is closed, and excludes all additional elements.

"Consisting essentially of" excludes additional material elements, but allows the inclusions of non-material elements that do not substantially change the nature of the invention.

"Effective amount" refers to an amount of metal-porphyrin catalyst sufficient to impart a measurable reduction in the concentration of halogenated decomposition byproducts (DBPs) and/or organic contaminants (all comprising "oxidant demand") that form decomposition byproducts (precursors) compared to results achieved by applying persulfate donor without an effective amount of said catalyst.

As used herein, the term "aquatic facility" is used with reference to all structural components and equipment comprising an aqueous system used by humans for exercise, sports and/or recreation. Examples of aquatic facilities include but are not limited to: residential swimming pools, water parks, theme parks, swimming pools, spas, therapy pools, hot tubs and the like.

As used herein, the term "aqueous system" describes a body of water 4 that can be treated using the disclosed composition. Examples of aqueous systems include recreational water, cooling towers, cooling ponds and wastewater.

As used herein, "recreational water" is water 4 used by mammals (i.e. humans) for various activities such as swimming, exercise, water sports, recreation, physical therapy and diving. Examples of aqueous systems comprising recreational water include: swimming pools, hot tubs, feature pools, spas, water-park rides, therapy pools, diving wells etc.

As used herein the term "Ct value" is defined as a value having the units (mg/l×min). One means for determining the Ct value is exemplified by calculating the product of the average concentration of an oxidant (mg/l) and time (minutes) of exposure to the oxidant. For example, if the average chlorine dioxide concentration of $ClO_2$ is determined to be 2.2 mg/l over a 20 minute period of time, the Ct value is calculated by multiplying the average concentration of chlorine dioxide by the time.

$$Ct\ value = 2.2\ mg/l \times 20\ min$$

$$Ct\ value = 44 (min \times mg/l)$$

Another example is exemplified by calculating the sum of the concentration times time over incremental periods. For example, the general equation:

$$Ct\ value = \Sigma[X_n \div n) \times T]$$

Illustrates that the sum of the average concentration measured over an increment of time provides an effective means of determining the Ct value. This method of determining the Ct value allows for an accumulating Ct value over short increments of time rather than longer periods as illustrated above.

The Ct value can be targeted based on laboratory and/or field studies to achieve the desired level of inactivation. Comparatively, low Ct values (i.e. Ct=1 mg·min/l) may achieve a 6-log reduction in bacteria like *E. coli*, while higher Ct values (i.e. Ct=90 mg·min/l) may be required to reduce a parasite like *Cryptosporidium* by 3-log.

As used herein, "algorithm to calculate the Ct value" describes a mathematical equation for calculating the Ct value in near real-time. One example of a suitable algorithm for calculating the Ct value follows:

$$Ct\ value = [(\Sigma X_n) \div n] \times T$$

Where:
"X" is the chlorine dioxide concentration in mg/l (or ppm).
"n" is the number of chlorine dioxide values recorded over a period of time since beginning the remediation cycle.
"T" is the period of time (minutes) that has lapsed since beginning the remediation cycle.

Another example of a suitable algorithm for calculating the Ct value follows the general equation:

$$Ct\ value = \Sigma[(X_n \div n) \times T]$$

Where:
"X" is the chlorine dioxide concentration in mg/l (or ppm).
"n" is the number of chlorine dioxide values recorded over the sampling period of time.
"T" is the period of time (minutes) that has lapsed during the sampling period.

The algorithm calculates the Ct value over the period of the remediation cycle. The algorithm calculates the sum of all the chlorine dioxide values recorded. The sum is divided by the number of chlorine dioxide values to obtain the average chlorine dioxide concentration. The average chlorine dioxide concentration is then multiplied by the lapsed time (minutes) to calculate the Ct value (mg/l×min). The Ct value is updated in real-time by calculating the rolling average of the chlorine dioxide concentration, then multiplying the rolling average by the lapsed time (minutes) since beginning the remediation cycle.

As used herein, "rolling average" is the average chlorine dioxide concentration resulting from the accumulated chlorine dioxide concentrations (mg/l) divided by the number of chlorine dioxide measurements by the chlorine dioxide sensor 14 and recorded. The rolling average is used to provide a real-time Ct value by multiplying the rolling average by the remediation cycle's lapsed time (i.e. number of minutes since beginning the remediation cycle), or the lapsed time during the sampling period. The rolling average can be updated over any desired period of lapsed time. One preferred period of lapsed time ranges from 0.1 to 60 minutes, more preferred 0.2 to 30 minutes, and most preferred 0.5 to 10 minutes.

As used herein, the term "remediation cycle" describes the process of introducing chlorine dioxide into the water of an aquatic facility at a concentration sufficient to achieve a targeted Ct value (min×mg/l). The chlorine dioxide can be introduced to the water 4 from the remediation feed system 26 using ex-situ and/or in-situ methods. An ex-situ method may comprise an chlorine dioxide generator as part of the remediation feed system 26. An in-situ method may comprise the cyclic process and/or UV activation of chlorite as part of the remediation feed system 26. The ex-situ method can be coupled with the in-situ method to accelerate the concentration of chlorine dioxide using a chlorine dioxide generator as well as maximize efficiency using the cyclic process.

Figure 9:
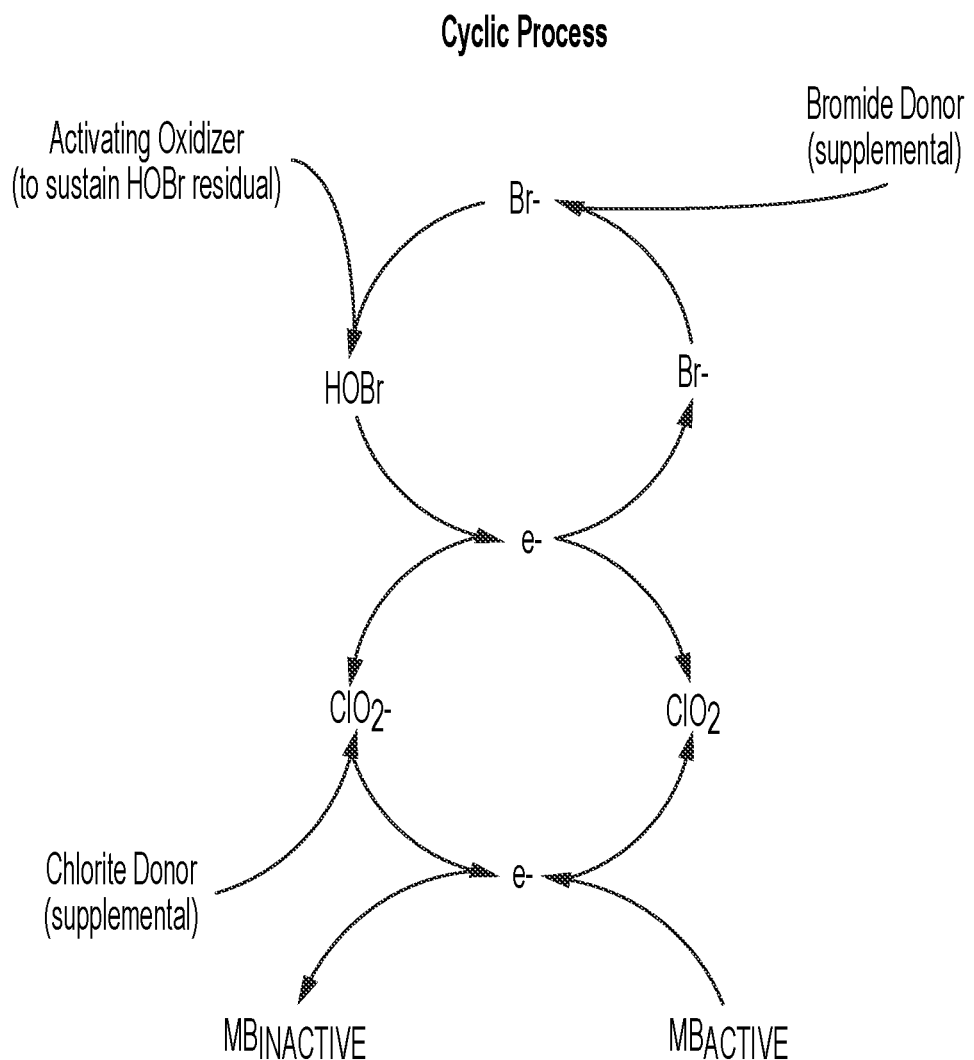
FIG. 9 illustrates the cyclic process for the in-situ generation of chlorine dioxide.

As used herein, the term "cyclic process" relates to the recycling of substantially inert anions comprising bromide and chlorite into their oxyhalogen surrogates, exemplified by hypobromous acid and chlorine dioxide respectfully followed by reduction back to their respective anions, and where the process is repeated (FIG. 9). The cyclic process comprises activating bromide ions with an oxidant to produce free bromine, the free bromine oxidizes chlorite ions to produce chlorine dioxide, and reducing at least some free bromine back to bromide ions.

As used herein, the term "chlorite anion donor" and "chlorite donor" is a compound that comprises an alkali metal salt comprising chlorite anions $ClO_2^-$, chlorine dioxide, or any convenient direct or indirect source of chlorite anions. For example, chlorine dioxide can indirectly produce chlorite due to reduction in an aqueous system. Sodium chlorite directly supplies chlorite anions.

As used herein, the term "chlorite anion" (also referred to as "chlorite") comprises chlorite having the general formula $ClO_2^-$. The chlorite is the anion released when sodium chlorite is dissolved in water and converts to chlorine dioxide.

As used herein, the term "recycled" means at least some portion of the recovered bromide anions and chlorite anions are regenerated to their respective oxyhalogen compounds, followed by reduction back to their respective anions, and where the process is repeated.

As used herein, the term "*Cryptosporidium*" is used to represent any form of parasitic microbiological organism from the family of *Cryptosporidium*. An example of *Cryptosporidium* is *Cryptosporidium parvum* (also referred to as *C. parvum*, *C. parvum* and *Cryptosporidium parvum*). Other examples of *Cryptosporidium* include but are not limited to: *C. hominis*, *C. canis*, *C. felis*, *C. meleagridis*, and *C. muris*. It is to be noted that inclusion or exclusion of italic characters or print when referring to *Cryptosporidium* or any of its many variants does not in any way detract from its intended descriptive meaning.

As used herein, the term "microbiological organisms" is used with reference to all forms of microbiological life including: parasites, bacteria, viruses, algae, fungus, and organisms encased in biofilms.

As used herein, "parasites" includes any species of organism including *Cryptosporidium*, *Giardia* and *Ameba* that can be transferred to humans by water and cause waterborne parasitic disease in humans.

As used herein, the term "inactivation" is used with reference to the ability to deactivate, kill, or destroy microbiological organisms.

As used herein, "remediation" is defined as the ability to reduce the level of waterborne pathogens and/or algae to levels at or below that deemed acceptable by various regulatory agencies exemplified by State and local Departments of Health, U.S. Environmental Protection Agency, and/or the Centers for Disease Control and Prevention. Examples of achieving remediation comprise at least one of the following: less than 1 CFU per ml of viable bacteria determined by heterotrophic plate count; greater than or equal to a 3-log reduction of parasites, and/or rendering the aqueous system free of algae.

As used herein, "remediation" is used with reference to achieving the Ct value necessary to achieve at least a 6-log reduction in gram negative and/or gram positive bacteria, virus &/or at least a 3-log reduction of parasites. Remediation is also used in reference to the ability to render the aqueous system free of algae.

As used herein, "programmable controller" 24 describes a control system comprising at least a microprocessor and/or programmable logic controllers (PLC) with relays and interfaces with sensors and chemical feed systems. The operations described herein can be implemented as executable code stored on a computer or machine readable non-transitory tangible storage medium in communication with the microprocessor.

Non-limiting examples of how the programmable controller 24 can be used to control chemical feed systems 40 includes: actuating chemical feed; varying the rate of chemical feed; energizing an electronic device such as a chemical feed pump, solenoid valve; stopping chemical feed; and initiating a neutralization cycle that removes residual chemicals from the water using neutralizing chemicals exemplified by sodium sulfite. The programmable controller 24 receives inputs either manually and/or automatically from sensors exemplified by the non-limiting examples: pH sensor 12, ORP sensor 8, amperometric sensor 10, chlorine dioxide sensor 14, temperature sensor 16, flow sensor 17, flow switch and the like.

The programmable controller 24 uses some form of control logic to control and optimize the feed of chemicals. Examples of control logic include: time-proportional, proportional, derivative, integral, proportional-integral-derivative control.

As used herein, "fluid contact" describes contact between conduits 32, 33 capable of transporting liquid to and from the main body of water (i.e. swimming pool) 4 at the aquatic facility. Specifically regarding aquatic facilities, sensors and chemical feed systems 40 are in fluid contact with the water 4 of an aquatic facility in or near the mechanical room where water is recovered from the pool, filtered 20, sometime heated 22 and returned to the pool. The piping (conduit) 36 transporting the water supplies water for the sensors to monitor the various parameters such as pH 12, sanitizer concentration 8, 10, temperature 16 and chlorine dioxide 14. Chemical feed 40 is generally applied into the return piping 33 after being filtered and where applicable heated to prevent corrosion of the heater 22.

As used herein, "chemical feed systems" 40 describe any convenient device that is fluid contact with both the chemicals and the water of the aquatic facility. The chemical feed systems 40 can be controlled to deliver the desired amount of chemicals exemplified by the non-limiting examples chlorine, acid such as HCl or $CO_2$ and sodium chlorite. Non-limiting examples of chemical feed systems include: chemical metering pumps, educators, modulating control valves and the like.

As used herein, "flow sensor" 17 describes a device that can detect a liquid flowing through a pipe or conduit 36. The flow sensor 17 can be a flow transmitter that measures the flow rate, but is not required to measure the flow rate. The flow sensor 17 detects motive water in the pipe or conduit 36. One non-limiting example of a flow sensor that does not measure the flow rate is a Rotorflow® Flow Sensor available by Gems™ Sensors and Controls.

As used herein, "energize" and "energizing" and its variations describes the activation of an electrical device by closing a circuit that delivers an electrical current to the electrical device so that the electrical device performs a desired function. For example, a flow sensor detects motive water followed by the control panel energizing the chemical feed systems. In contrast, when motive water is no longer confirmed by the flow sensor, the control panel stops the chemical feed systems.

As used herein, "actuated" and "actuating" and its variations is an action initiated by the control panel to cause something to happen such as initiating chemical feed, stopping chemical feed, initiating a neutralization cycle and the like.

As used herein, the term "free chlorine" is used with reference to a chlorine source that hydrolyses in the aqueous system to produce at least some portion of hypochlorous acid and hypochlorite ions.

As used herein, the term "free bromine" is used with reference to the formation or presence of hypobromous acid and possibly some portion of hypobromite ions.

As used herein, the term "inactivation" is used with reference to the ability to deactivate, kill, or destroy microbiological organisms.

As used herein, the term "microbiological organisms" is used with reference to all forms of microbiological life forms including: parasites, bacteria, viruses, algae, fungus, and organisms encased in biofilms.

As used herein, the term "free halogen donor" is used with reference to a halogen source which acts as an active oxidizer when dissolved in water. Chlorine based free halogen donors form at least one of $Cl_2$, HOCl, and $OCl^-$ (also referred to as free chlorine) when added to water, whereby the species formed is pH dependent. Bromine based free halogen donors form at least one of $Br_2$, HOBr, and $OBr^-$ (also referred to as free bromine), again the species being pH dependent.

As used herein, "sensor for controlling the feed of sanitizer" is used with reference to ORP and/or amperometric sensors that are in fluid contact with the water of an aquatic facility, and provide measurements used for controlling the feed of a sanitizer (e.g. chlorine and/or bromine). While only one sensor is used to control the sanitizer at any given time, it is beneficial to monitor both ORP and free chlorine. Also it may be advantageous to be able to switch between sensors depending on the method of remediation being employed. For example, daily remediation may best be controlled using an amperometric sensor for controlling the sanitizer to limit the concentration of sanitizer in the water. This ensures the pool can be readily opened without the need for removing excess sanitizer before opening. However, during a rapid recovery shock, it may be advantageous to increase the sanitizer concentration to accelerate the cyclic process when in-situ generation of chlorine dioxide is used. The ability to program the programmable controller to switch between sensors based on the method being used can be very beneficial.

As used herein, "amperometric sensor" 10 describes a device that is in fluid contact with the water of an aquatic facility and is used to measure the concentration of sanitizer exemplified by free chlorine. The amperometric sensor 10 can be used to control the feed of sanitizer.

As used herein, "chlorine dioxide sensor" 14 describes a device that is in fluid contact with the water 4 of an aquatic facility and is used to measure the chlorine dioxide concentrated used to remediate the aquatic facility. Generally the chlorine dioxide sensor 14 is an amperometric sensor that incorporates a gas permeable membrane that allows chlorine dioxide gas to permeate the membrane while isolating the sensor from water soluble oxidizers like chlorine. The chlorine dioxide sensor 14 can be any suitable sensor that can be used to selectively measure the chlorine dioxide. One example of another type of chlorine dioxide sensor is a colorimetric device that utilizes lissamine green reagents to selectively measure chlorine dioxide in the presence of sanitizers.

As used herein, "ORP sensor" 8 describes a device that is in fluid contact with the water of an aquatic facility and is used to measure the Oxidation Reduction Potential (ORP) of the water 4. ORP sensor 8 can be sued to control the feed of sanitizer.

As used herein, "chemical feed systems" 40 describes in broad terms any desirable means for applying chemicals to the water 4 of an aquatic facility. Non-limiting examples of chemical feed systems include: chemical metering pumps, educators, erosion feeders such as a chlorinator or brominator.

As used herein, "Heterotrophic plate count (HPC) is also known by a number of other names, including standard plate count, total plate count, total viable count or aerobic quality count. It does not differentiate between the types of bacteria present nor does it indicate the total number of bacteria present in the water—only those capable of forming visible colonies under specified conditions on certain non-selective microbiological media. Varying the incubation temperature will favour the growth of different groups of bacteria. As it gives more meaningful information about pathogenic (disease-causing) bacteria, 35° C. (or 37° C.) is the preferred incubation temperature. HPC does not necessarily indicate microbiological safety as the bacteria isolated may not have been faecally-derived but it does give a measure of the overall general quality of the pool water, and whether the filtration and disinfection systems are operating satisfactorily. Results reported by the laboratory are traditionally expressed as colony forming units per millilitre (CFU/mL) which equates to the number of bacteria in each millilitre of the original sample of water. A HPC count of less than 1 CFU/mL indicates that the disinfection system is effective. If the count is between 10 and 100 CFU/mL, a routine investigation should be conducted as soon as possible to ensure that all the management operations are functioning properly.

As used herein, "CFU" (Colony Forming Units) is a unit used in microbiology to estimate the number of viable bacteria or fungal cells in a sample.

EXAMPLES

A 46,000 gallon swimming pool in Boca Raton Florida was used as a test site for testing automated control of remediation cycles. Daily remediation using the cyclic process was performed in the evening hours, while Rapid Recovery Shock using both the cyclic process and UV activation of chlorite ions was performed during daylight hours.

The swimming pool was equipped with a System 5 controller acquired from BECS Technology, Inc. located in Saint Louis, Missouri. The System 5 controller comprised ORP, pH, amperometric and temperature sensors. A CRONOS chlorine dioxide controller was acquired from Process Instruments located in Lancashire, UK. The CRONOS controller was fitted with a DioSense sensor comprising an amperometric sensor capped with a gas permeable membrane. The CRONOS was calibrated using a lissamine green test that is specific to chlorine dioxide. Both control systems have data logging and the System 5 controller further comprised events logging capability to record time and duration of chemical feed etc.

A side stream of water circulated through the filter system was used as source of water for the described sensors. After passing thru the sensor's flow cells, the water was discharged into the diatomaceous earth filter pit.

Calcium hypochlorite was the sanitizer and hydrochloric acid was used for pH control. Cryptolyte® is a trademarked source of 25% active sodium chlorite solution. The pool water was treated with granular sodium bromide to provide approximately 15 ppm bromide ions ($Br^-$).

Test #1 is represented by FIGS. 1 and 2. Test #1 consisted of a daily remediation using the cyclic process. The sanitizer feed was controlled by ORP. The remediation cycle was initiated automatically at 8:00 pm by the System 5 controller. Cryptolyte® was applied at a dosage of 0.2 lbs per 10,000 gallons of pool water (approximately 0.44 ppm as $ClO_2^-$). FIG. 1 shows the chlorine dioxide concentration measured by the CRONOS controller. The corresponding Ct values are indicated. FIG. 2 illustrates the events log for Test #1. The events log shows Crytpolyte was applied beginning at 8:00 pm and the event lasted for 15 minutes. The ORP dropped significantly due to the application of sodium chlorite which is a source of demand. The drop in ORP caused the System 5 controller to begin feeding sanitizer to regain the ORP set-point. A Ct value of 66 (min×mg/l) was achieved in 5 hours which based on GLP data illustrated in FIG. 8 is sufficient to achieve a 3-log reduction in *Cryptosporidium*.

Figure 3:
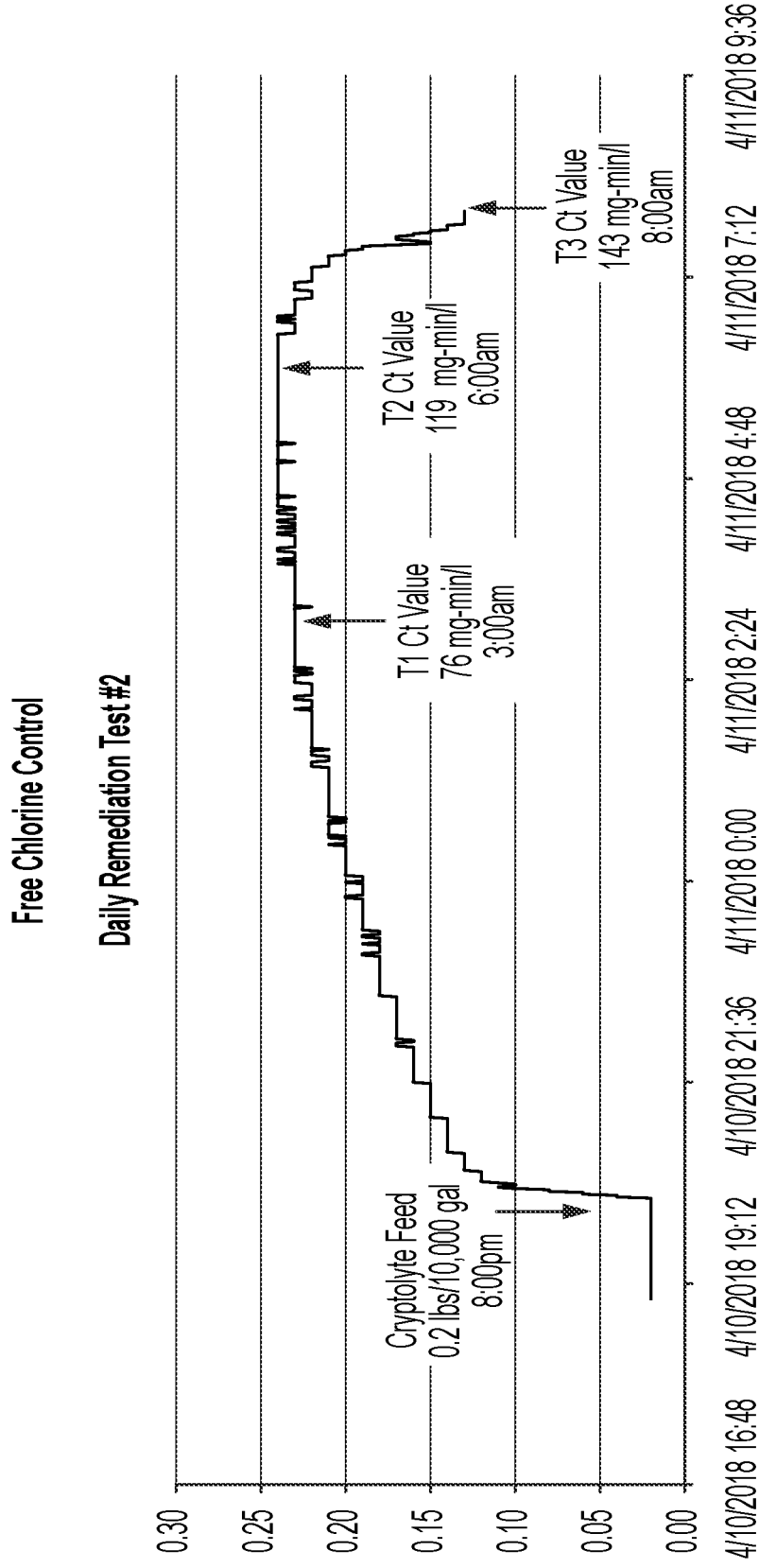
FIG. 3 illustrates the chlorine dioxide concentration and calculated Ct Value (min×mg/l) for a daily remediation (test #2) using the cyclic process for the in-situ generation of chlorine dioxide. In this test, the chlorine concentration remained stable illustrating what occurs when the control system is converted to amperometric control of the chlorine feed.
Figure 4:
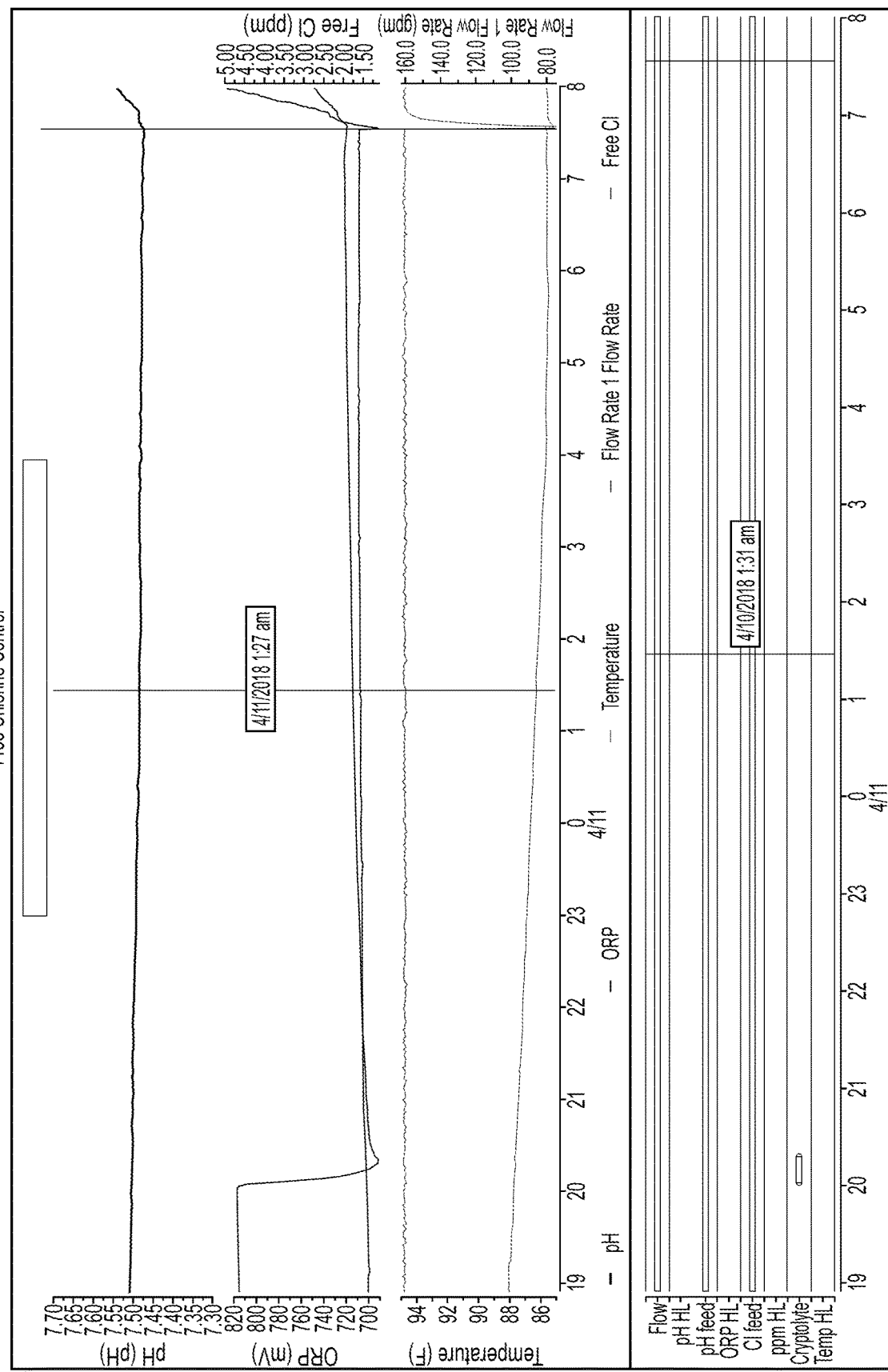
FIG. 4 illustrates the free chlorine in test #2 measured using an amperometric sensor remained relatively constant during the remediation process.

Test #2 is represented by FIGS. 3 and 4. The process of Test #1 was repeated with the exception the calcium hypochlorite feeder was bypassed to prevent the spike in chlorine concentration thereby representing amperometric control of the sanitizer. While the amperometric measurement showed virtually no change in free chlorine, the cyclic process allowed for the remediation cycle to achieve a Ct value of 76 (min×mg/l) by 3:00 am.

Figure 5:
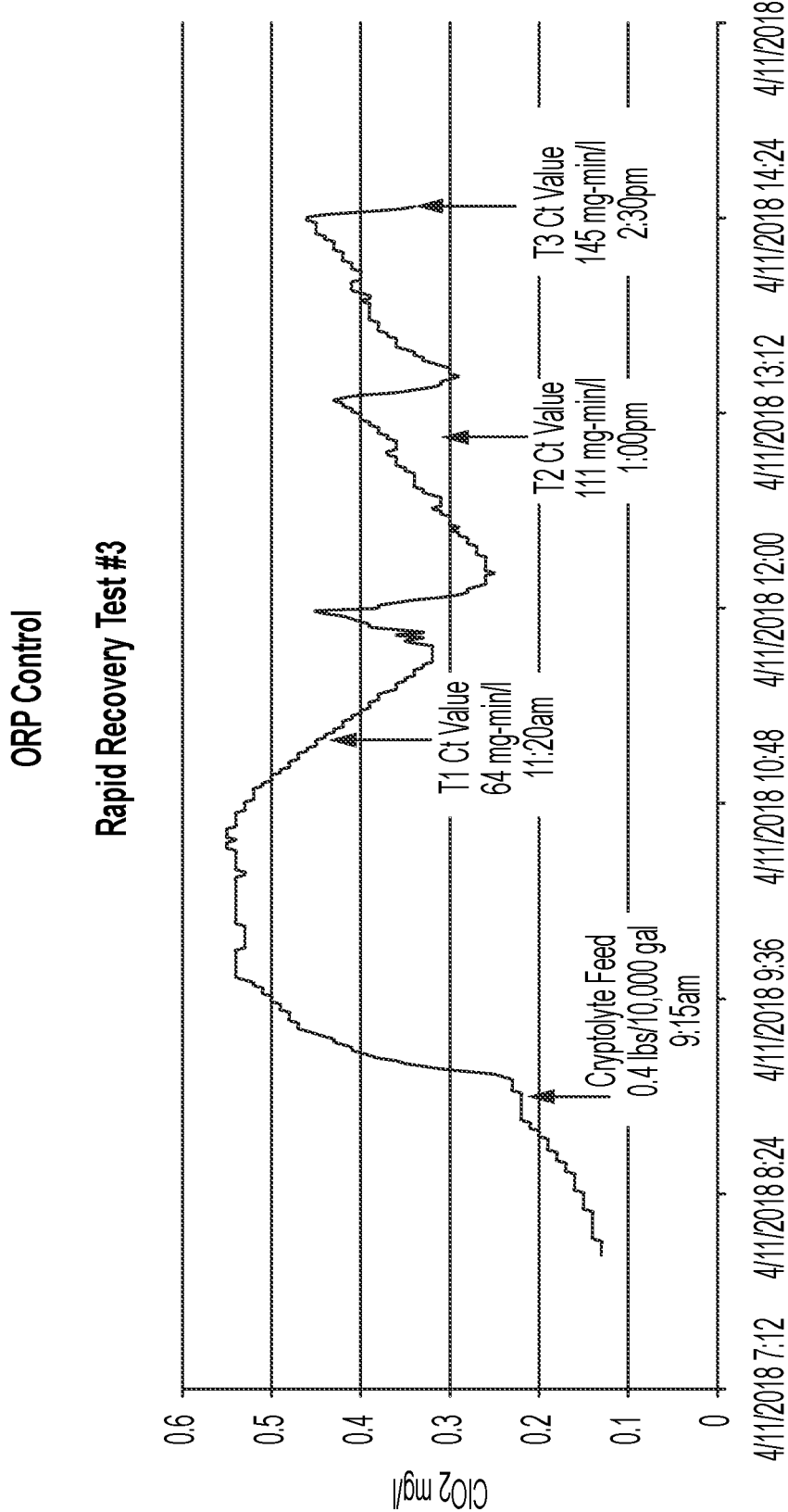
FIG. 5 illustrates test #3 which represented a Rapid Recovery Shock during daytime hours. This treatment method exemplifies the method employed to recover an aquatic facility quickly after a known event such as a fecal release.
Figure 6:
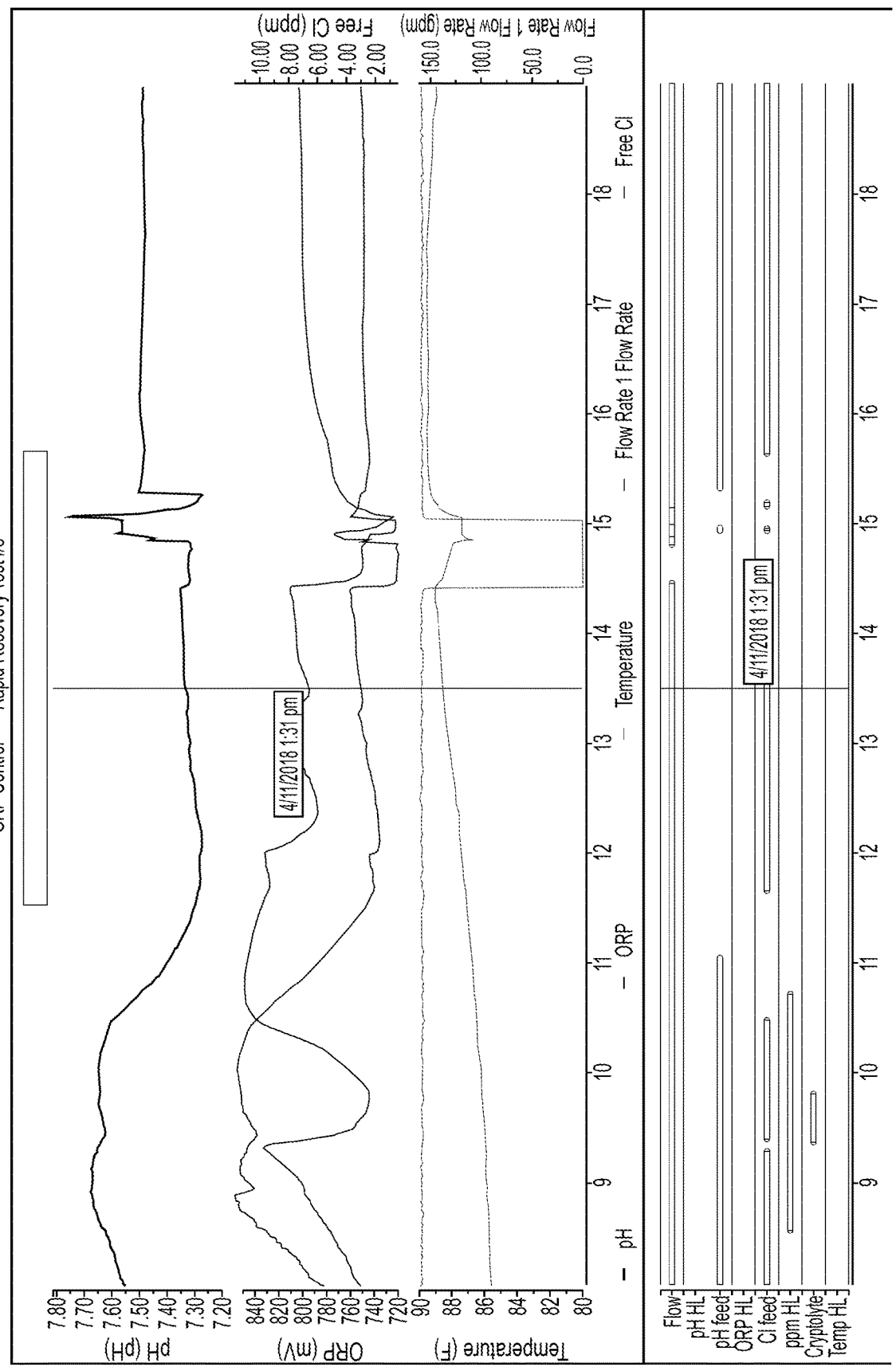
FIG. 6 illustrates the events that took place during test #3.

Test #3 represented by FIGS. 5 and 6 illustrates a rapid recovery shock using a combination of the cyclic process and UV activation of chlorite ions. The pool water was treated with 0.5 ppm of a chromophore comprising Keyfluor™ White CBS-X which possesses a UV absorbance peak near 360 nm but only minimal UV absorbance at 260 nm. This allows the UV from the sun to activate chlorite at 260 nm but block the decomposition of chlorine dioxide with a UV peak at 360 nm. The remediation cycle was initiated at 9:15 am (FIG. 6). Cryptolyte was applied at a dose of 0.4 lbs per 10,000 gallons of pool water providing approximately 0.88 ppm as $ClO_2^-$.

FIG. 5 illustrates a Ct value of 64 (min×mg/l) was achieve at 11:20 am just over 2 hours and five minutes after initiation of the remediation cycle.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method for controlling a remediation of pathogens resistant to chlorine in water of an aquatic facility, the method comprising:
providing a system comprising at least one sanitizer sensor for measuring a concentration of sanitizer in the water, a pH sensor for measuring a pH of the water, a temperature sensor for measuring a temperature of the water, and a chlorine dioxide sensor for measuring a concentration of chlorine dioxide in the water, the at least one sanitizer sensor, the pH sensor, the temperature sensor and the chlorine dioxide sensor being interfaced with a programmable controller that is programmed to implement a remediation cycle and configured to calculate a chlorine dioxide Ct value of the water, and the programmable controller is interfaced with a chemical feed system that is in fluid contact with the water;
implementing the remediation cycle by the programmable controller;
introducing the chlorine dioxide into the water by the chemical feed system;
measuring the chlorine dioxide concentration in the water by the chlorine dioxide sensor;
the programmable controller calculating the chlorine dioxide Ct value of the water in real time based on measurements of the chlorine dioxide in the water;
the programmable controller automatically adjusting the chlorine dioxide concentration in the water to achieve a targeted chlorine dioxide Ct value within a set time interval to achieve remediation of the water, wherein the remediation is at least a 3- log reduction of at least one pathogen resistant to the chlorine in the water, and terminate the remediation cycle, and controlling the pH and the sanitizer concentration by the programmable controller.

2. The method according to claim 1, wherein the programmable controller uses an algorithm to calculate the chlorine dioxide Ct value comprising:

$$Ct\ \text{value} = [(\Sigma X_n) \div n] \times T$$

Where:
"X" is the chlorine dioxide concentration in mg/l;
"n" is a number of chlorine dioxide values recorded over a period of time since beginning the remediation cycle; and
"T" is a period of time in minutes that has lapsed since beginning the remediation cycle.

3. The method according to claim 1, wherein the at least one sanitizer sensor is an ORP sensor.

4. The method according to claim 1, wherein the at least one sanitizer sensor is an amperometric sensor.

5. The method according to claim 1, wherein the at least one sanitizer sensor is both ORP and amperometric sensors.

6. The method according to claim 1, wherein the implementation of the remediation cycle is initiated automatically by the programmable controller.

7. The method according to claim 1, wherein the implementation of the remediation cycle is initiated manually and then controlled by the programmable controller.

8. The method according to claim 1, wherein the programmable controller calculates, records, and stores the chlorine dioxide Ct value.

9. The method according to claim 1, wherein the programmable controller displays the chlorine dioxide Ct value.

10. The method according to claim 1, wherein said step of introducing the chlorine dioxide is introduced using a chlorine dioxide generator.

11. The method according to claim 1, wherein said step of introducing the chlorine dioxide is introduced using UV activation of chlorite ions.

12. The method according to claim 1, wherein said step of introducing the chlorine dioxide is introduced using both a chlorine dioxide generator and cyclic process, the cyclic process comprising: activating bromide ions with an oxidant to produce free bromine, the free bromine oxidizes chlorite ions to produce the chlorine dioxide, and reducing at least some of the free bromine back to the bromide ions.

13. The method according to claim 1, further comprising neutralizing excess chlorine dioxide.

14. The method according to claim 1, further comprising neutralizing excess sanitizer.

15. A method for controlling a remediation of pathogens resistant to chlorine in water of an aquatic facility, the method comprising:
   implementing a remediation cycle by a programmable controller;
   introducing chlorine dioxide into the water by a chemical feed system in communication with the programmable controller;
   measuring a chlorine dioxide concentration by a chlorine dioxide sensor in communication with the programmable controller;
   calculating a chlorine dioxide Ct value in real time by the programmable controller based on the chlorine dioxide concentration in the water; and
   the programmable controller sustaining the concentration of the chlorine dioxide in the water until a targeted chlorine dioxide Ct value of the water is reached to achieve remediation of the water, wherein the remediation is at least a 3-log reduction of at least one pathogen resistant to the chlorine in the water.

16. A method for controlling a remediation of *Cryptosporidium* in water of an aquatic facility, the method comprising:
   providing a system comprising at least one sanitizer sensor for measuring a concentration of sanitizer in the water, a pH sensor for measuring a pH of the water, a temperature sensor for measuring a temperature of the water, and a chlorine dioxide sensor for measuring a concentration of chlorine dioxide in the water, the at least one sanitizer sensor, the pH sensor, the temperature sensor and the chlorine dioxide sensor being interfaced with a programmable controller that is programmed to implement a remediation cycle and configured to calculate a chlorine dioxide Ct value of the water, and the programmable controller is interfaced with a chemical feed system that is in fluid contact with the water;
   implementing the remediation cycle by the programmable controller;
   introducing the chlorine dioxide into the water by the chemical feed system;
   measuring the chlorine dioxide concentration by the chlorine dioxide sensor;
   the programmable controller calculating the chlorine dioxide Ct value of the water in real time based on measurements of the chlorine dioxide in the water;
   the programmable controller automatically adjusting the chlorine dioxide concentration to achieve a targeted chlorine dioxide Ct value to remediate the *Cryptosporidium* in the water within a set time interval and terminate the remediation cycle, wherein the remediation achieves greater than or equal to a 3-log reduction of the *Cryptosporidium* in the water, and
   controlling the pH and the sanitizer concentration by the programmable controller.

17. A method for controlling a remediation of *Giardia* in water of an aquatic facility, the method comprising:
   providing a system comprising at least one sanitizer sensor for measuring a concentration of sanitizer in the water, a pH sensor for measuring a pH of the water, a temperature sensor for measuring a temperature of the water, and a chlorine dioxide sensor for measuring a concentration of chlorine dioxide in the water, the at least one sanitizer sensor, the pH sensor, the temperature sensor and the chlorine dioxide sensor being interfaced with a programmable controller that is programmed to implement a remediation cycle and configured to calculate a chlorine dioxide Ct value of the water, and the programmable controller is interfaced with a chemical feed system that is in fluid contact with the water;
   implementing the remediation cycle by the programmable controller;
   introducing the chlorine dioxide into the water by the chemical feed system;
   measuring the chlorine dioxide concentration by the chlorine dioxide sensor;
   the programmable controller calculating the chlorine dioxide Ct value of the water in real time based on measurements of the chlorine dioxide in the water;
   the programmable controller automatically adjusting the chlorine dioxide concentration to achieve a targeted chlorine dioxide Ct value to remediate the *Giardia* in the water within a set time interval and terminate the remediation cycle, wherein the remediation achieves greater than or equal to a 3-log reduction of the Giardia in the water, and
   controlling the pH and the sanitizer concentration by the programmable controller.

18. A method for controlling a remediation of *Ameba* in water of an aquatic facility, the method comprising:
   providing a system comprising at least one sanitizer sensor for measuring a concentration of sanitizer in the water, a pH sensor for measuring a pH of the water, a temperature sensor for measuring a temperature of the water, and a chlorine dioxide sensor for measuring a concentration of chlorine dioxide in the water, the at least one sanitizer sensor, the pH sensor, the temperature sensor and the chlorine dioxide sensor being interfaced with a programmable controller that is programmed to implement a remediation cycle and configured to calculate a chlorine dioxide Ct value of the water in real time, and the programmable controller is interfaced with a chemical feed system that is in fluid contact with the water;
   implementing the remediation cycle by the programmable controller;
   introducing the chlorine dioxide into the water by the chemical feed system;
   measuring the chlorine dioxide concentration by the chlorine dioxide sensor;
   the programmable controller calculating the chlorine dioxide Ct value of the water in real time based on measurements of the chlorine dioxide in the water;
   the programmable controller automatically adjusting the chlorine dioxide concentration to achieve a targeted chlorine dioxide Ct value to remediate the *Ameba* in the water within a set time interval and terminate the remediation cycle, wherein the remediation achieves greater than or equal to a 3-log reduction of the *Ameba* in the water, and
   controlling the pH and the sanitizer concentration by the programmable controller.

19. The method in accordance with claim 1, wherein the at least one pathogen is a parasite.

20. The method in accordance with claim 19, wherein the parasite is *Cryptosporidium*.

21. The method in accordance with claim 19, wherein the parasite is *Giardia*.

22. The method in accordance with claim 19, wherein the parasite is an *Ameba*.

23. The method in accordance with claim 1, wherein the at least one pathogen is a bacteria protected by biofilm.

24. The method in accordance with claim 1, wherein the programmable controller recording chlorine dioxide concentrations of the water and calculating an average chlorine dioxide concentration in the water by dividing sum of the recorded chlorine dioxide concentrations by a number of recorded values and calculating the chlorine dioxide Ct value of the water using the average chlorine dioxide concentration.

25. The method according to claim 24, comprising the programmable controller calculating the chlorine dioxide Ct value based on a rolling average of the chlorine dioxide concentration in the water.

26. The method in accordance with claim 25, wherein the rolling average is calculated every 0.1 to 60 minutes.

27. The method in accordance with claim 25, wherein the rolling average is calculated every 0.2 to 30 minutes.

28. The method in accordance with claim 25, wherein the rolling average is calculated every 0.5 to 10 minutes.

29. The method in accordance with claim 1, wherein the calculated chlorine dioxide Ct Value is used to forecast when the targeted chlorine dioxide Ct Value will be achieved.

30. The method according to claim 1, wherein the chlorine dioxide concentration ranges from 0.0 to 2.0 ppm as $ClO_2$ during a daily remediation.

31. The method according to claim 1, wherein the chlorine dioxide concentration ranges from 0.0 to 20 ppm as $ClO_2$ during a shock remediation.

32. The method according to claim 1, wherein the programmable controller is programed to evaluate previous remediation cycles of the aquatic facility and project the concentration of the chlorine dioxide and/or application rate of the chlorine dioxide in future remediation cycles to achieve the targeted chlorine dioxide Ct value within a desired time interval unique to the aquatic facility.

33. The method according to claim 1, wherein the aquatic facility is used by humans for swimming, exercise, water sports, recreation, physical therapy, or diving.

34. The method in accordance with claim 15, wherein the programmable controller recording chlorine dioxide concentrations of the water and calculating an average chlorine dioxide concentration in the water by dividing sum of the recorded chlorine dioxide concentrations by a number of recorded values and calculating the chlorine dioxide Ct value of the water using the average chlorine dioxide concentration.

35. The method according to claim 15, further comprising calculating the chlorine dioxide Ct value based on a rolling average of the chlorine dioxide concentration in the water.

36. The method according to claim 15, wherein said step of introducing chlorine dioxide is introduced using a chlorine dioxide generator.

37. The method according to claim 15, wherein said step of introducing chlorine dioxide is introduced using UV activation of chlorite ions.

38. The method according to claim 15, wherein the step of introducing the chlorine dioxide is introduced using cyclic process comprising activating bromide ions with an oxidant to produce free bromine, the free bromine oxidizes chlorite ions to produce the chlorine dioxide, and reducing at least some of the free bromine back to the bromide ions and repeating the cyclic process.

* * * * *